(12) United States Patent
Nemeth et al.

(10) Patent No.: US 11,198,283 B2
(45) Date of Patent: Dec. 14, 2021

(54) LED CURING DURING VACUUM LAMINATION PROCESS

(71) Applicant: Rockwell Collins, Inc., Cedar Rapids, IA (US)

(72) Inventors: Paul R. Nemeth, Springville, IA (US); Cameron T. McCalley, Marion, IA (US); Ryan N. Klaassen, Marion, IA (US); James D. Sampica, Anamosa, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 166 days.

(21) Appl. No.: 16/388,532

(22) Filed: Apr. 18, 2019

(65) Prior Publication Data

US 2020/0331248 A1 Oct. 22, 2020

(51) Int. Cl.
*B32B 37/12* (2006.01)
*H01L 51/52* (2006.01)
*G02F 1/1339* (2006.01)
*B32B 7/12* (2006.01)
*B32B 41/00* (2006.01)

(52) U.S. Cl.
CPC ........... *B32B 37/12* (2013.01); *B32B 7/12* (2013.01); *G02F 1/1339* (2013.01); *H01L 51/5246* (2013.01); *B32B 41/00* (2013.01); *B32B 2037/1253* (2013.01); *B32B 2457/202* (2013.01); *B32B 2457/206* (2013.01)

(58) Field of Classification Search
CPC ... B32B 37/12; B32B 7/12; B32B 2037/1253; B32B 2457/202; B32B 2457/206
See application file for complete search history.

(56) References Cited

U.S. PATENT DOCUMENTS

| | | | |
|---|---|---|---|
| 6,224,709 B1* | 5/2001 | Takemoto | C09J 5/00 156/275.5 |
| 9,731,477 B1* | 8/2017 | Menon | B32B 37/144 |
| 2009/0277578 A1* | 11/2009 | Sung | G06F 3/03543 156/285 |
| 2011/0177261 A1* | 7/2011 | Ishii | G02F 1/133308 428/1.5 |
| 2012/0276354 A1* | 11/2012 | Thompson | G02B 1/04 428/217 |

* cited by examiner

*Primary Examiner* — Daniel McNally
(74) *Attorney, Agent, or Firm* — Suiter Swantz pc llo (57) ABSTRACT

A laminating machine includes UV curing elements within the process chamber to cure a UV curable adhesive in a laminating stack while being heated in an autoclave. In an automated process, the laminating machine applies pressure to the stack for pressure sensitive adhesion, then autoclave heating and simultaneous UV curing. The UV curing elements are disposed in the body of the process chamber, the lid of the process chamber, or a separate appliance. The appliance can be releasably attached to the process chamber body or lid. The laminating machine is programmed for specific autoclave and UV exposure profiles specific to the UV curable adhesives being used.

6 Claims, 10 Drawing Sheets

LED CURING DURING VACUUM LAMINATION PROCESS

BACKGROUND

In some display fabrication processes, for example liquid crystal displays (LCD), one or more rigid or semi-rigid substrates must be bonded to the display layer. Such bonding is often achieved via lamination. Laminating processes, particularly within instrument panel production, such as in aircraft and automotive display panels, generally includes optically bonding a glass layer to a substrate via an optically clear pressure sensitive adhesive and compressing the stack for a period of time in a process chamber while the assembly is exposed to a vacuum.

Certain adhesives for optically coupling substrates have been developed that start as inherently low modulus materials that may be cured post-lamination to increase modulus for structural integrity. Post lamination ultraviolet (UV) curing requires an additional process step, additional floor space, additional product handling, additional equipment, and labor.

SUMMARY

In one aspect, embodiments of the inventive concepts disclosed herein are directed to a laminating machine having UV curing elements within the process chamber to cure a UV curable adhesive in a laminating stack while completing the optical bonding process.

In an automated process, the laminating machine initially applies mechanical pressure to a stack to seal the edges, heats and joins the substrates while under vacuum, then pressurizes the process chamber and performs UV curing during an autoclave step.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a laminating machine and automated process for UV curing within the process chamber while exposing the assembly in an autoclave cycle.

Figure 1:
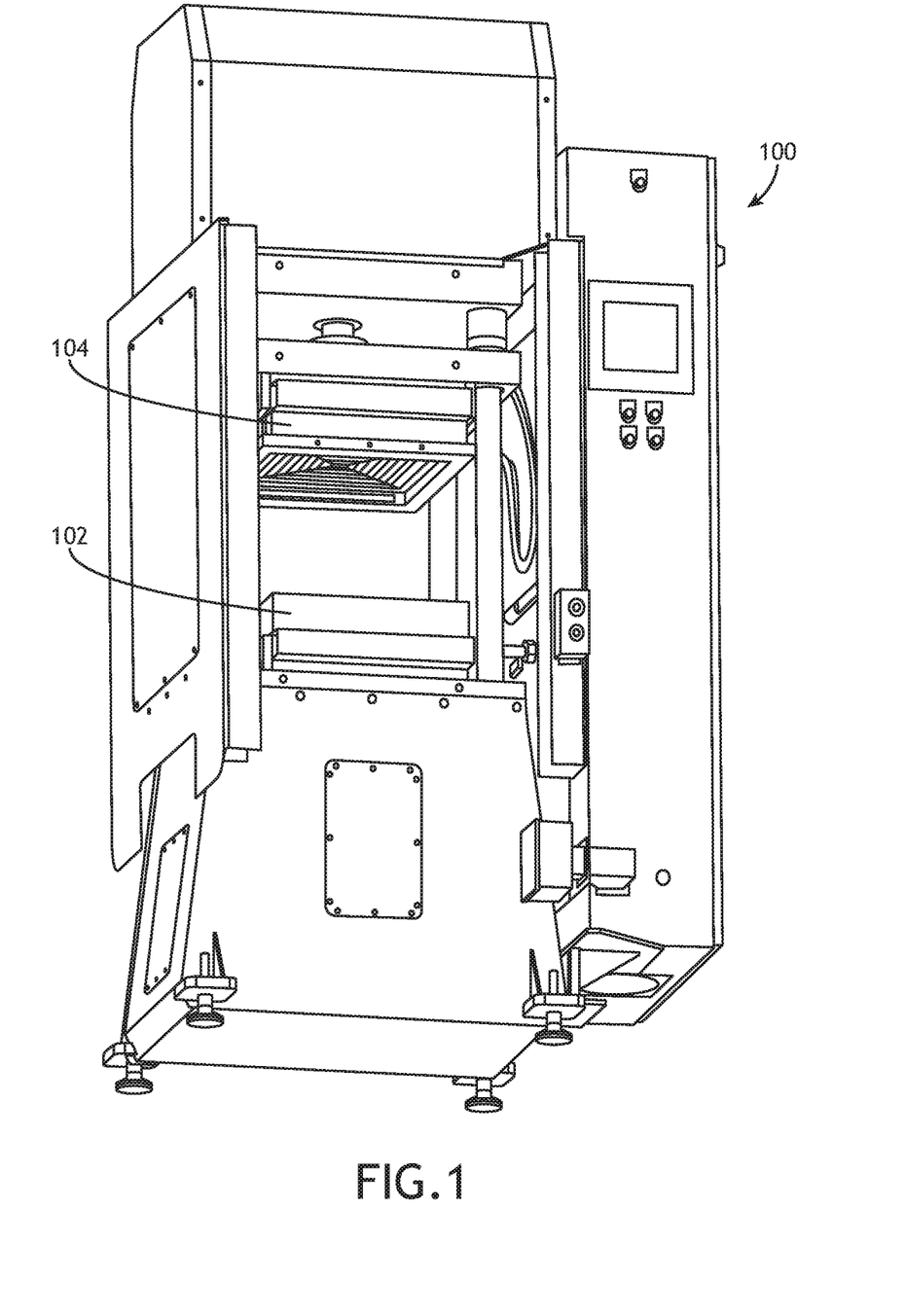
FIG. 1 shows a perspective view of a laminating machine according to an exemplary embodiment.

Referring to FIG. 1, a perspective view of a laminating machine 100 according to an exemplary embodiment is shown. In at least one embodiment, the laminating machine 100 includes a process chamber 102 and process chamber lid 104. The process chamber lid 104 may include elements for applying mechanical pressure to a laminating stack including at least one substrate and a pressure sensitive adhesive, UV curable adhesive, or both. In at least one embodiment, the laminating machine 100 includes one or more heating elements disposed to heat the process chamber 102 and process chamber lid 104.

In at least one embodiment, the process chamber 102 or process chamber 102 and process chamber lid 104 includes one or more UV curing elements disposed to illuminate a laminating stack within the process chamber 102 and cure UV curable adhesives within the laminating stack.

In at least one embodiment, the laminating machine includes a processing element connected to a vacuum pump, the elements for applying pressure to the laminating stack, the one or more heating elements, and the one or more UV curing elements. The processor may automate one or more steps of the laminating processes as more fully described herein.

Figure 2:
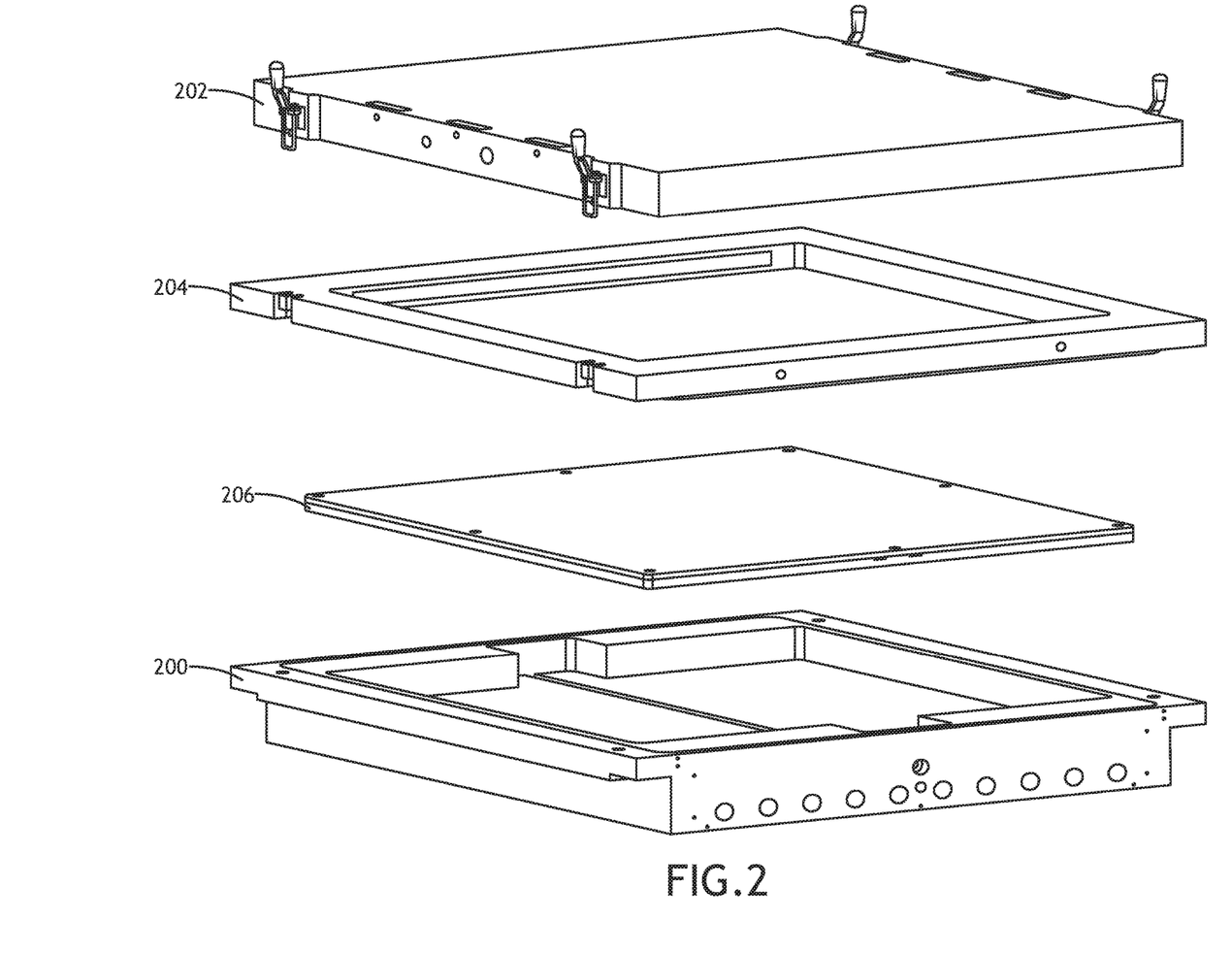
FIG. 2 shows an exploded view of a laminating machine process chamber and UV curing element frame, UV curing plate and a dosimeter according to an exemplary embodiment.

Referring to FIG. 2, an exploded view of a laminating machine process chamber UV curing element frame and plate according to an exemplary embodiment is shown. The laminating machine includes a process chamber 200 and process chamber lid 202. In at least one embodiment, the laminating machine includes a curing plate 206 configured to receive a laminating stack including pressure sensitive and/or UV curable adhesives. The process chamber 200, process chamber lid 202, and/or one or more curing plates 206 may be adapted to apply mechanical or pneumatic pressure to the laminating stack.

The laminating machine frame includes one or more curing elements 204. The curing elements 204 include UV wavelength Light Emitting Diodes (LEDs) specific to the curable adhesive, disposed to illuminate the laminating stack within the process chamber 200. In at least one embodiment, the one or more curing elements 204 are disposed in the process chamber 200 or the process chamber lid 202. In another embodiment, the one or more curing elements 204 are disposed in a separate curing element frame that may be affixed to the process chamber 200 or process chamber lid 202, or disposed between the process chamber 200 and process chamber lid 202. In at least one embodiment, the curing elements 204 and curing plate 206 may operate in conjunction to illuminate every surface of the laminating stack.

Alternatively, the curing elements 204 and curing plates 206 may include non-LED UV lamps, provided such lamps are configured to operate in laminating processes including heating and pressure variations.

In at least one embodiment, the curing elements 204 are releasably connected to the process chamber lid 202 to retrofit laminating machines.

least one embodiment, the curing elements 204 and curing plates 206 are releasably connected to the process chamber 200 to retrofit laminating machines.

Figure 3:
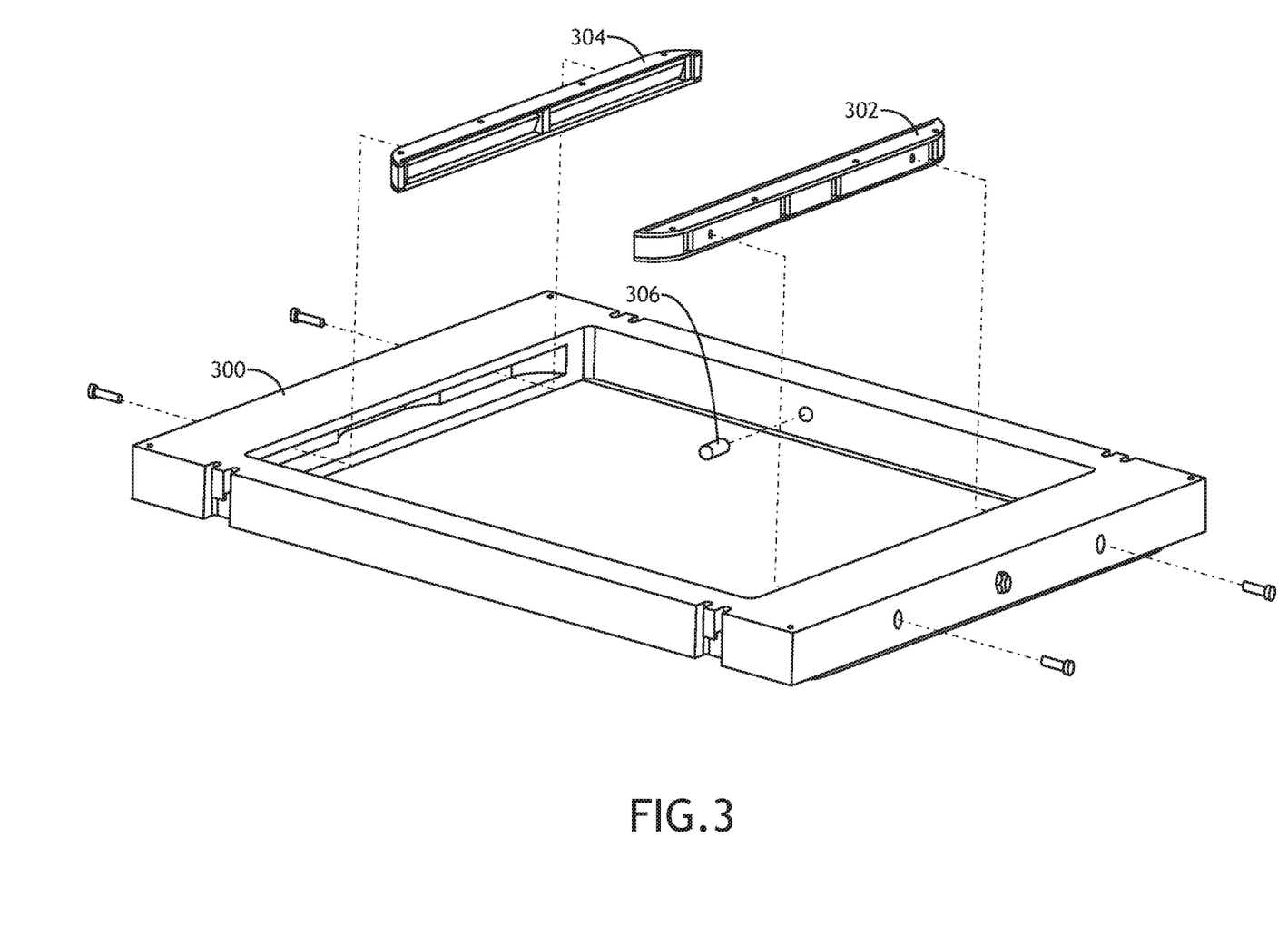
FIG. 3 shows an exploded view of a curing element frame according to an exemplary embodiment.

Referring to FIG. 3, an exploded view of a curing element frame 300 according to an exemplary embodiment is shown. In at least one embodiment, curing elements 302, 304 are disposed within the curing element frame 300 to evenly illuminate a laminating stack within the curing element frame (and corresponding process chamber). In at least one embodiment, a dosimeter 306 is disposed within the curing element frame 300

Figure 4A:
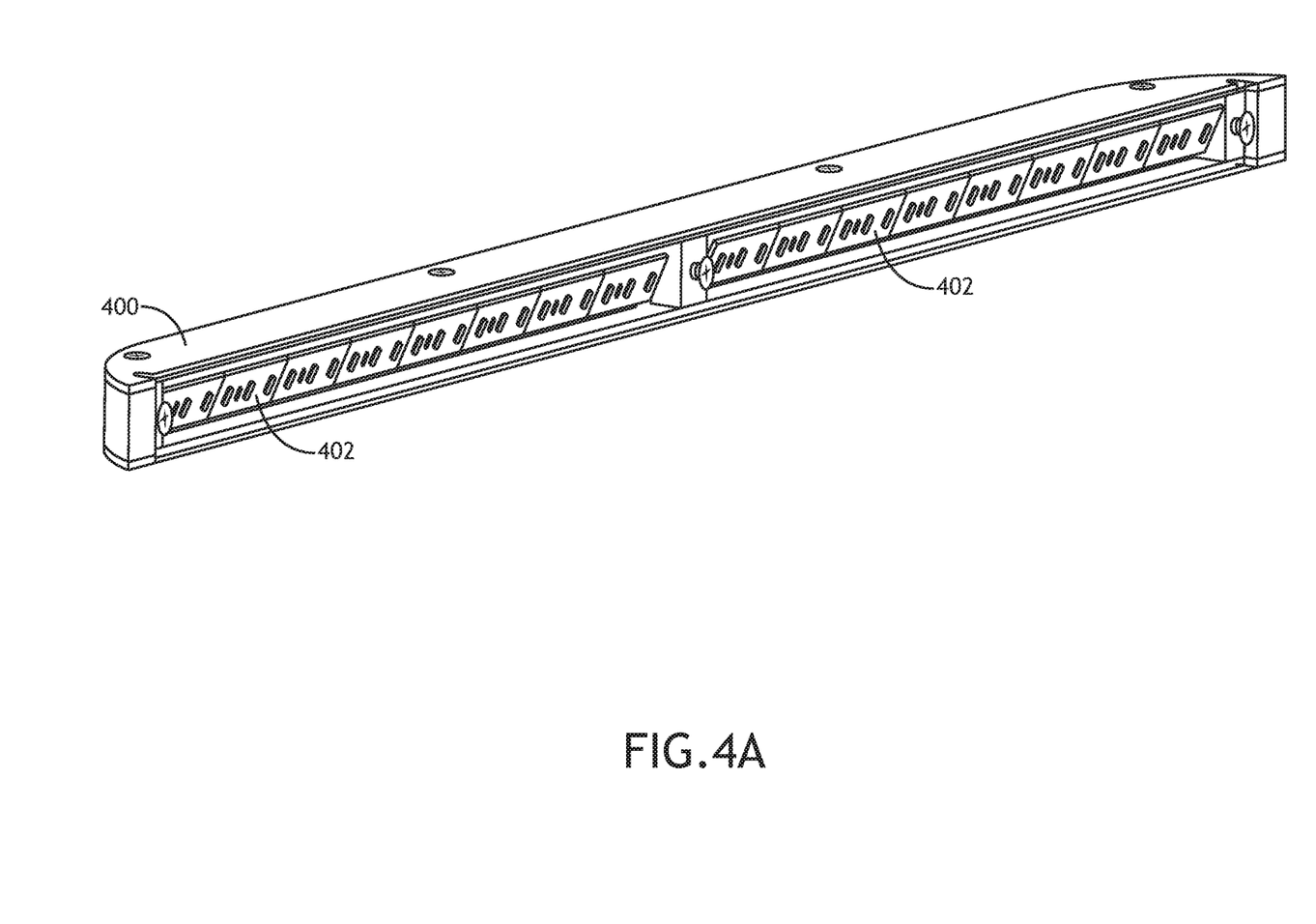
FIG. 4A shows a perspective view of a curing element according to an exemplary embodiment.
Figure 4B:
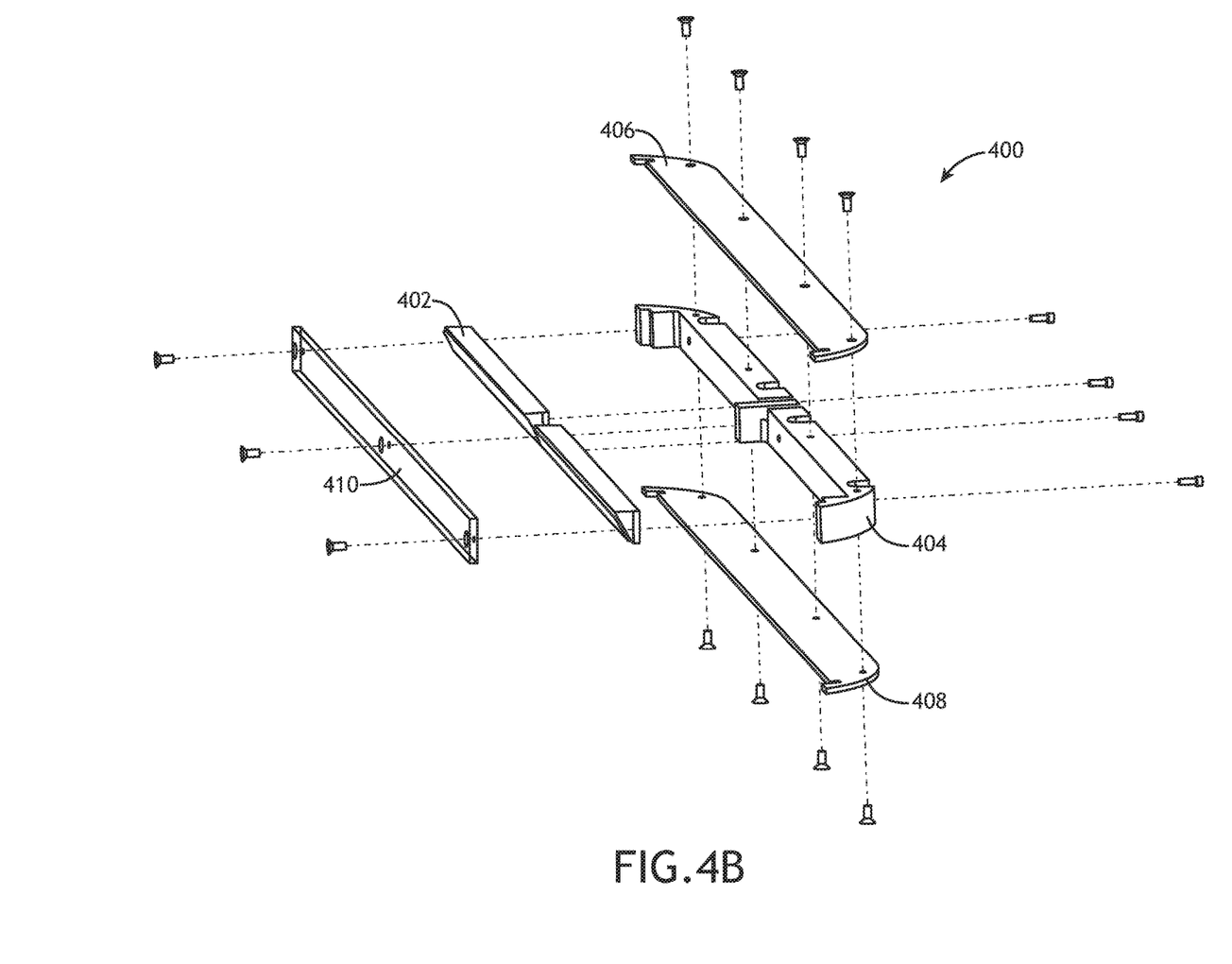
FIG. 4B shows an exploded view of a curing element according to an exemplary embodiment.

Referring to FIGS. 4A and 4B, a perspective view and exploded view of a curing element 400 according to an exemplary embodiment are shown. The curing element 400 includes one or more UV LEDs 402. The UV LEDs 402 may be disposed in one or more LED housings defined by a housing body 404, a top plate 406, and a bottom plate 408. The housing may also be defined by a lens portion 410. Because the curing elements 400 are intended to operate in a laminating process that may include significant shifts in pressure and temperature, the LED housings may be configured to shield the UV LEDs 402. Furthermore, the LED housings may define replaceable LED banks.

Figure 5A:
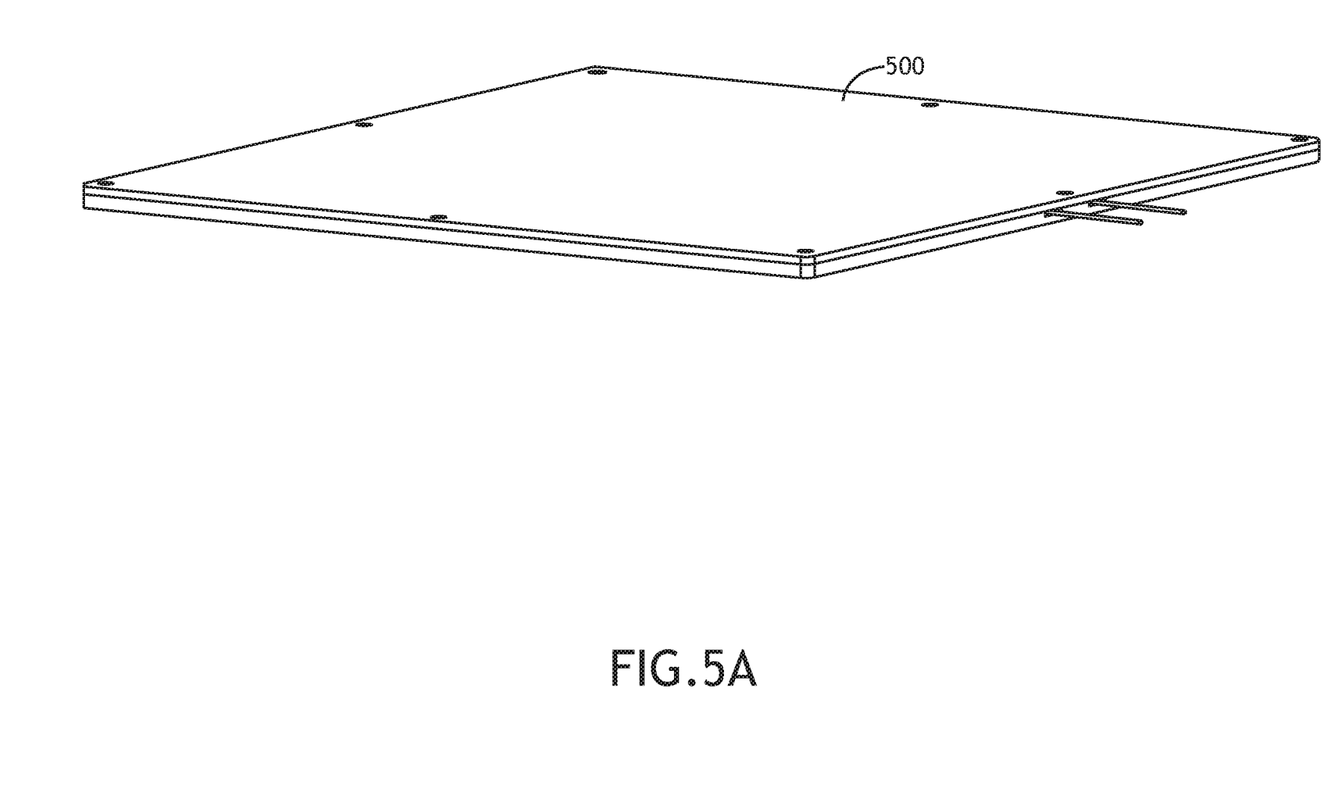
FIG. 5A shows a perspective view of a UV curing plate according to an exemplary embodiment.
Figure 5B:
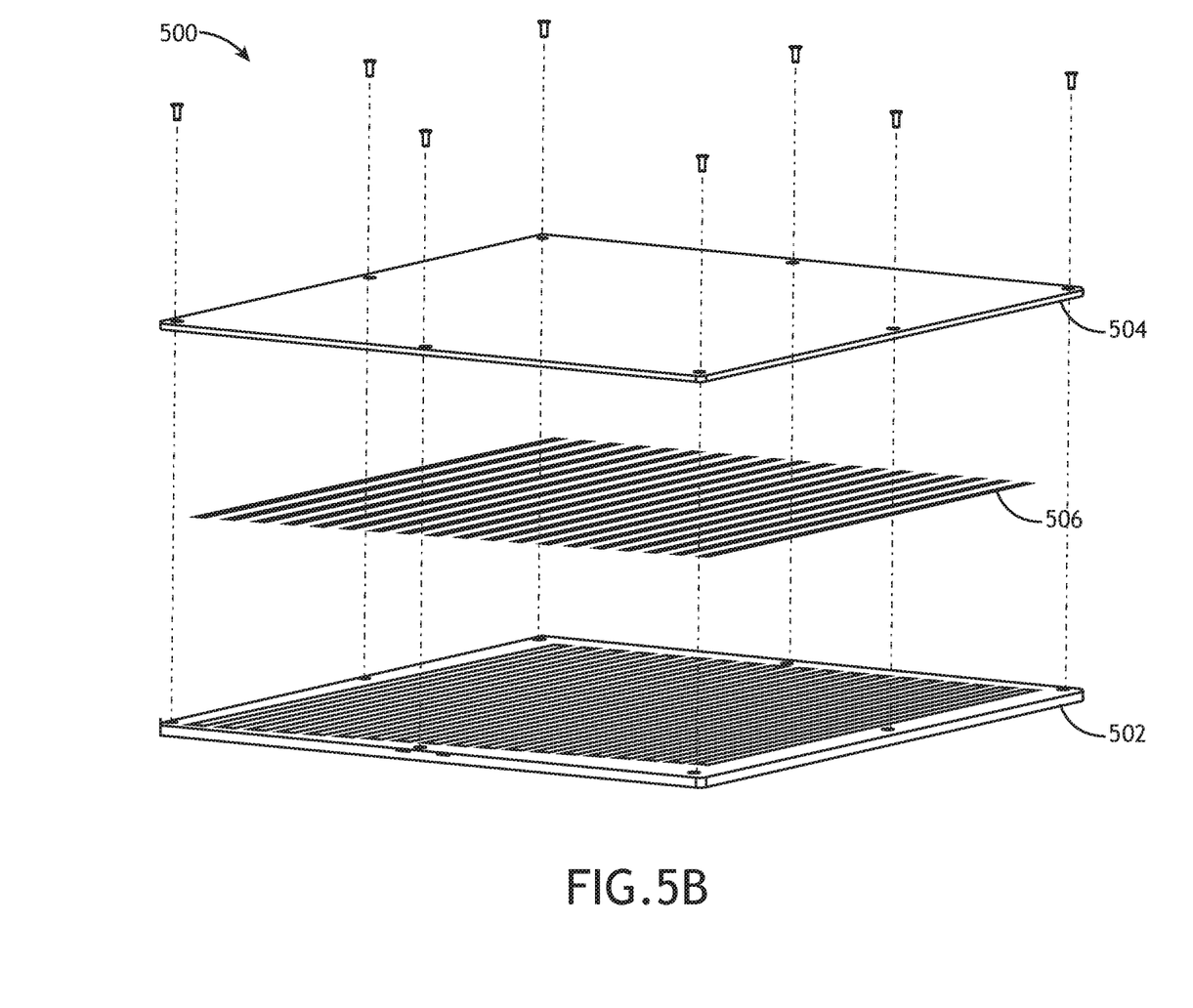
FIG. 5B shows an exploded view of a UV curing plate according to an exemplary embodiment.

Referring to FIGS. 5A and 5B, a perspective view and exploded view of a UV curing plate 500 according to an exemplary embodiment are shown. The UV curing plate 500 includes one or more UV LEDs 506. The UV LEDs 506 may be disposed in one or more LED housings defined by a housing body 502. The housing may also be defined by a lens portion 504. Because the UV curing plate 500 is intended to operate in a laminating process that may include significant shifts in pressure and temperature, the LED housings may be configured to shield the UV LEDs 506. Furthermore, the LED housing may define replaceable LED banks.

Figure 6:
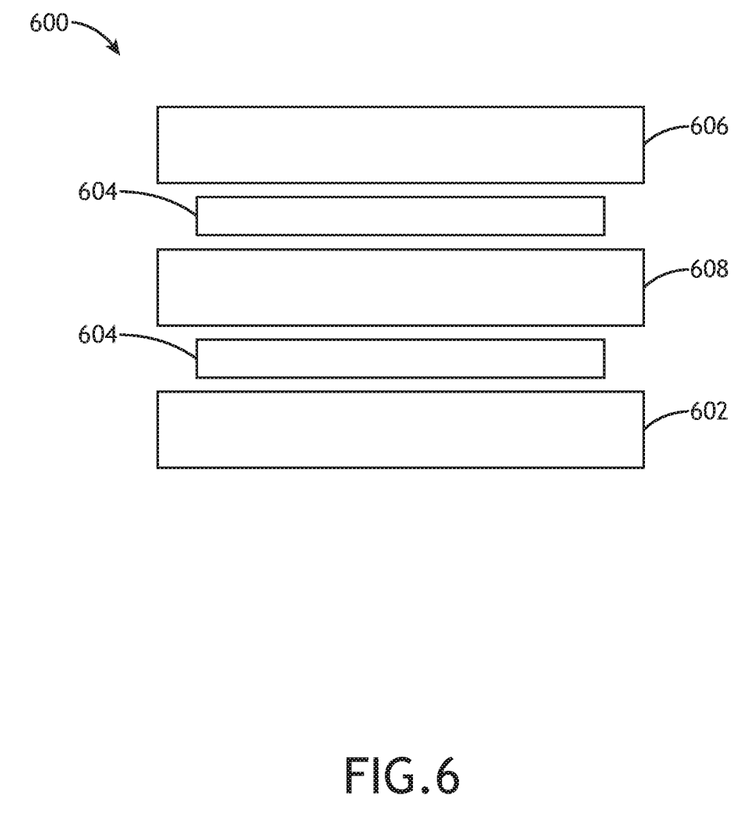
FIG. 6 shows a perspective view of a laminating stack according to an exemplary embodiment.

Referring to FIG. 6 a perspective view of a laminating stack 600 according to an exemplary embodiment is shown. In at least one embodiment, a laminating stack includes a first substrate 602, one or more adhesive layers 604, and a second substrate 606. The adhesive layer 604 may be an optically clear UV curable acrylic or similar adhesives containing photo-initiators.

The first substrate 602 may be a rigid or semi rigid backing material such as a glass layer, a liquid crystal display (LCD) module, Organic Light Emitting Diode (OLED) display or other such device. The second substrate 506 may be a transparent glass layer.

In at least one embodiment, one or more layers 608 are disposed between the first substrate 602 and second substrate 606. In at least one embodiment, the layers 608 comprises an LCD module or components of an LCD module such as polarizers or glass, OLED or other display devices disposed proximal to the one or more adhesive layers 604.

Figure 7:
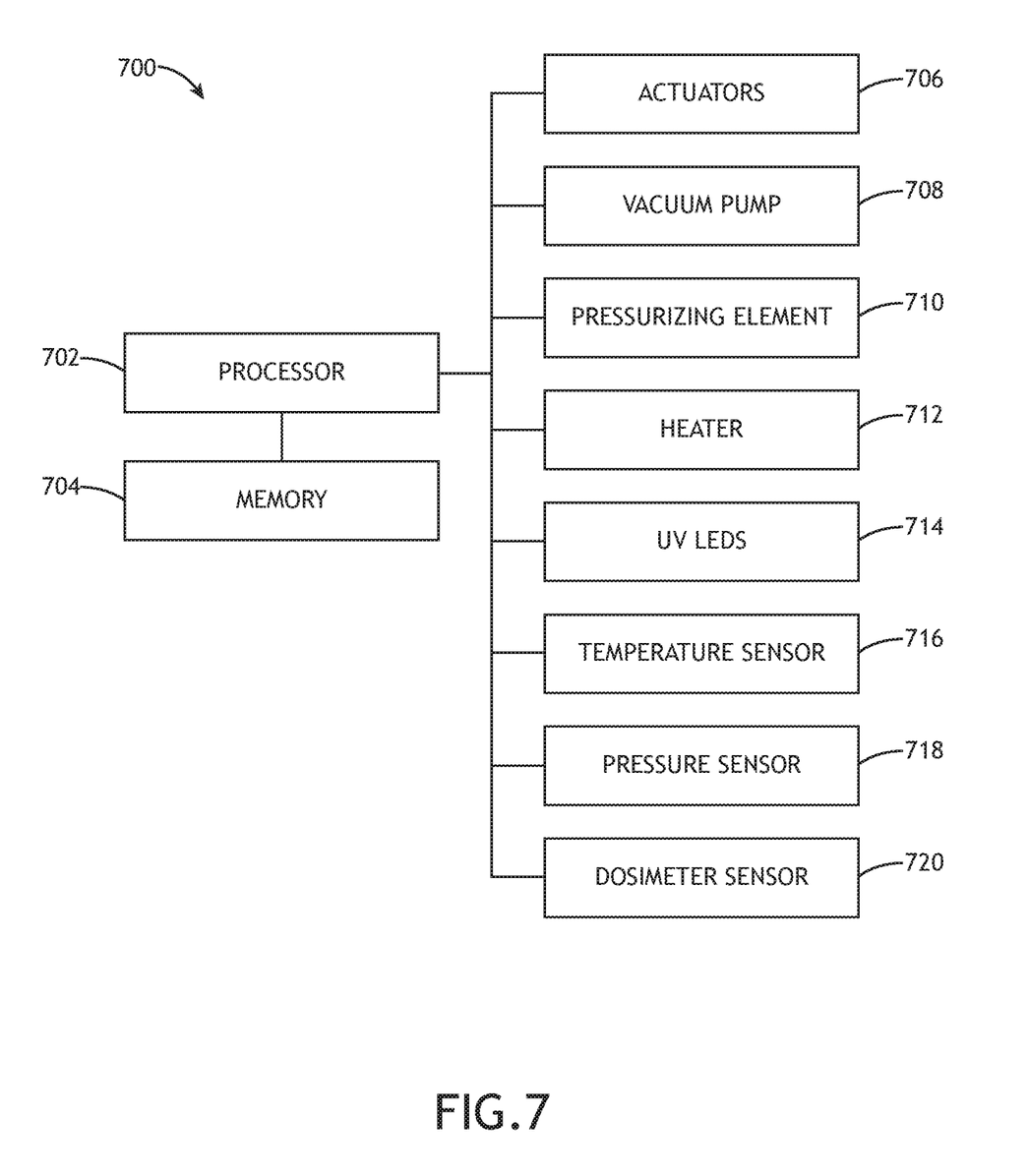
FIG. 7 shows a block diagram of a system for implementing exemplary embodiments.

Referring to FIG. 7, a block diagram of a system 700 for implementing exemplary embodiments is shown. The system 700, generally embodied in an automated laminating machine, includes a processor 702 and memory 704 for embodying processor executable code to configure the processor 602 to actuate one or more actuators 706 connected to the processor 702 and seal a process chamber. The processor 702 then activates a vacuum pump 708 to create a vacuum within the process chamber. The processor 702 may then activate a pressurizing element 710, such as one or more linear actuators or an inflatable membrane within the process chamber, to create a linear force on a laminating stack within the process chamber. The linear force may, if applied for a predefined dwell time according to the specific adhesive, permits adhesion between substrates and UV curable adhesives within the laminating stack. After the predefined dwell time, the membrane is stowed and the process chamber is pressurized to ambient pressure before completing the Autoclave exposure.

In at least one embodiment, the processor 702 activates a heater 712 to heat the process chamber to a temperature corresponding to the specific adhesive. While pressurizing, the processor 702 activates one or more UV curing devices 714 such as UV LEDs or UV lamps. The processor 702 may keep the UV curing devices 714 illuminated for a duration specific to the curable adhesive or until minimal programmed requirements are met for dosage as measured by a dosimeter 720 in data communication with the processor 702. In at least one embodiment, the processor 702 may continue illuminating the UV curing devices 714 while venting the process chamber.

The system 700 may also include one or more temperature sensors 716, one or more pressure sensors 718 and one or more dosimeter sensors 720 to continually monitor the temperature, pressure and UV light dosage of the process chamber generally and the laminating stack specifically with respect to a known curing profile specific to the UV curable adhesive being used.

Figure 8:
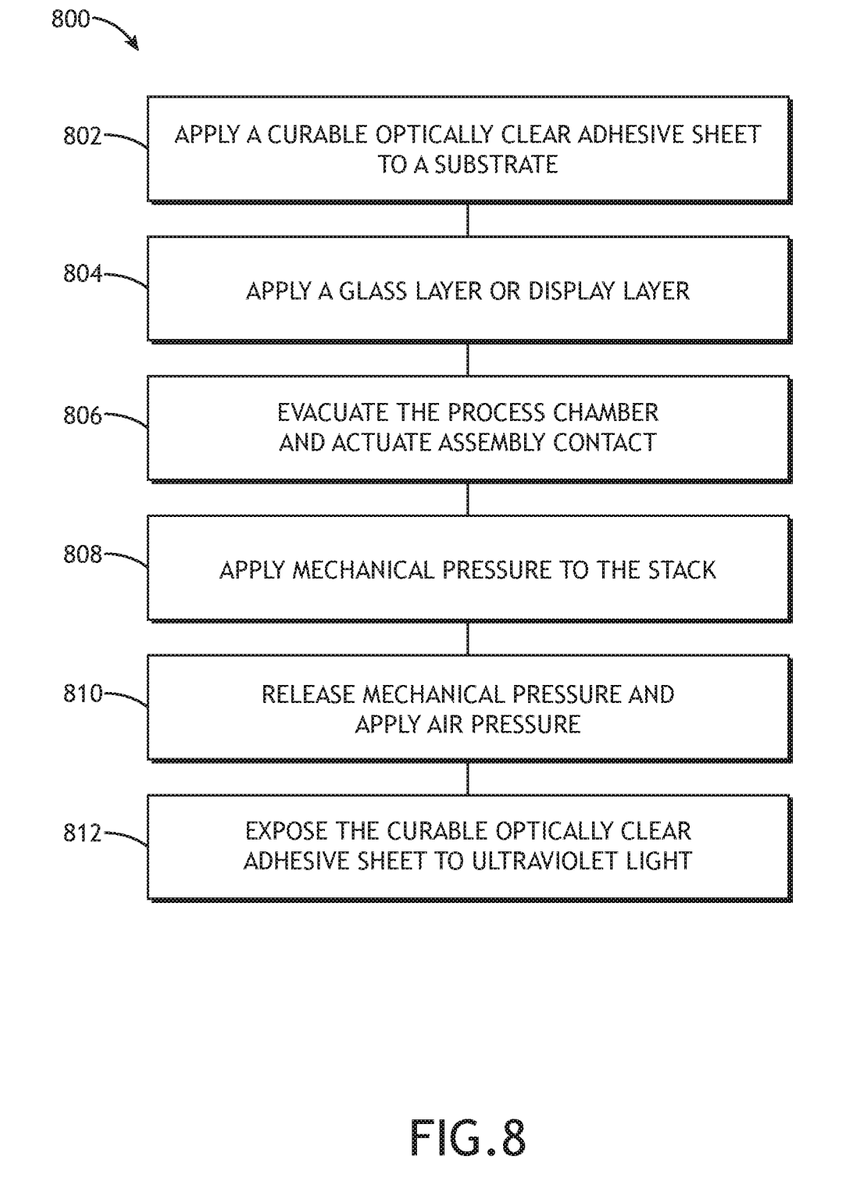
FIG. 8 shows a flowchart for a method of curing a laminating stack according to an exemplary embodiment.

Referring to FIG. 8, a flowchart for a method 800 of curing a laminating stack according to an exemplary embodiment is shown. The method 800 includes constructing a laminating stack by applying 802 a UV curable, optically clear adhesive to a first substrate, and applying 804 a second substrate, such as a glass layer or display layer, to the UV curable adhesive Using an automated laminating machine. In some embodiments, multiple combined layers of UV curable adhesive may be applied 802, this combined curable adhesive layer structure can include combinations of both UV curable and non-UV curable adhesive layers and the laminating stack may include multiple layers such as an LCD module or other display devices between the substrate layers.

Within the automated laminating machine, the process chamber is evacuated 806 so that the laminating stack is exposed to a vacuum environment and mechanical or pneumatic pressure is applied 808 to the stack for a specified dwell time. The mechanical or pneumatic pressure is removed and the laminating stack is exposed to air pressure 810 with continued heating to remove vacuum voids and defects in the UV curable adhesive layer and at the glass or LCD interface. While being heated and maintaining air pressure, the laminating stack is exposed 812 to UV light to cure the UV curable adhesive.

In at least one embodiment, the laminating stack is cooled while being exposed to UV light.

Systems and methods according to the present disclosure allow for significantly thinner bond-lines with embedded cross-sections. Acrylic or other UV curable adhesives are applied having a low modulus and acquire an increased modulus with greater structural integrity after UV curing. Such systems and methods allow for cross-sectional changes such as light leak mask, heater flex, frames, etc to be effectively embedded in the adhesive while maintaining minimal adhesive thickness.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A method for laminating a substrate comprising:
applying an optically clear ultraviolet (UV) curable adhesive to a first substrate to form a laminating stack;
applying a second substrate layer to the laminating stack;
applying a linear force to the first substrate via an inflatable membrane within a process chamber;
heating the laminating stack;
exposing the laminating stack to UV light to cure the UV curable adhesive while heating; and
venting the process chamber while continually exposing the laminating stack to UV light.

2. The method of claim 1, further comprising applying at least one of a liquid crystal display (LCD) element or Organic Light Emitting Diode (OLED) element between the UV curable adhesive and second substrate layer.

3. The method of claim 2, further comprising applying a second optically clear UV curable adhesive layer between the first substrate and the at least one of a liquid crystal display (LCD) element or Organic Light Emitting Diode (OLED) element.

4. The method of claim 3, further comprising applying autoclave type pressure to the laminating stack during UV exposure.

5. The method of claim 1, further comprising applying pressure to the laminating stack during UV exposure.

6. The method of claim 1, further comprising:
placing the laminating stack under a vacuum;
applying pressure to the laminating stack;
retaining the laminating stack in the vacuum, under autoclave type pressure, for a defined waiting period with heat;
cooling the laminating stack while continuing UV exposure.

\* \* \* \* \*